Nov. 18, 1969     E. D. HAUK     3,478,577

APPARATUS AND METHOD FOR TESTING WELL PIPE

Filed March 18, 1968     4 Sheets-Sheet 1

INVENTOR.
ERNEST D. HAUK
BY
ATTORNEYS.

Nov. 18, 1969  E. D. HAUK  3,478,577
APPARATUS AND METHOD FOR TESTING WELL PIPE
Filed March 18, 1968  4 Sheets-Sheet 2

INVENTOR.
ERNEST D. HAUK
BY Jennings & Carr
ATTORNEYS.

Nov. 18, 1969 E. D. HAUK 3,478,577
APPARATUS AND METHOD FOR TESTING WELL PIPE
Filed March 18, 1968 4 Sheets-Sheet 3

INVENTOR.
ERNEST D. HAUK
BY
ATTORNEYS.

United States Patent Office 3,478,577
Patented Nov. 18, 1969

3,478,577
APPARATUS AND METHOD FOR TESTING WELL PIPE
Ernest D. Hauk, Signal Hill, Calif., assignor of ten percent to Kenneth J. Carstensen, Bakersfield, Calif.
Filed Mar. 18, 1968, Ser. No. 713,613
Int. Cl. G01m 3/08
U.S. Cl. 73—49.1         26 Claims

ABSTRACT OF THE DISCLOSURE

A pipe-testing apparatus and method for use in connection with oil wells, etc., and wherein water or other low-viscosity fluid is introduced extremely rapidly into the pipe section to be tested. Such high-velocity introduction of water dynamically simultaneously energizes the seals or packers at the ends of the test chamber and builds up static pressure within the chamber to maintain seal energization after cessation of flow.

BACKGROUND OF THE INVENTION

Field of the invention

This invention relates to the field of defining, sealing and charging chambers within pipes. More specifically, the field is that of testing pipes by introducing fluid pressure into the interiors thereof and then determining whether or not the introduced fluid leaks out.

Description of the prior art

The testing of sections of oil-well tubing, casing, etc., by creating high fluid pressures therein is a highly developed art, representative prior-art patents including, for example, Knapp et al. Patent 3,071,960 and Loomis Patent 2,807,955. The Knapp patent is typical of a substantial number of patents wherein the packers at opposite ends of the test chamber remain in contact with the internal wall of the tubing (or other pipe section) at all times. The result is a very substantial amount of wear on the packers during periods when the test apparatus is shifted longitudinally within the pipe, it being emphasized that the internal pipe wall may be rough, coated with scale, and characterized by the presence of rod cuts and other deformities.

The Loomis patent is typical of various prior-art patents wherein the packers do not remain in contact with the interior pipe wall, being instead energized and expanded after the desired longitudinal positioning is achieved. However, the energizing of the seals has been a major problem in that it has required the use of high-pressure relief valves with consequent loss of energy, and requirements for adjustment, etc. Other patents require the use of several water-supply conduits, as distinguished from only a single conduit, in order to first energize the seals and then charge the chamber.

Various prior-art apparatus and methods are also characterized by their low-speed operation, this being an important factor when it is considered that testing apparatus is frequently rented at a high hourly rate. Furthermore, the prior art is deficient relative to creation of adequate seals at points where the internal tubing wall is substantially deformed, as by rod cuts. Other problems relate to the complexity and expense of prior-art apparatus.

SUMMARY OF THE INVENTION

In accordance with the present method and apparatus, the packers are of the type which do not remain in contact with the interior tubing wall, but do not require relief valves or additional fluid lines, etc., for energization. Instead, energization of the packers is achieved dynamically by introducing fluid sufficiently fast that sealing contact is made with the tubing wall as the fluid is introduced, following which the static pressure within the chamber maintains the seals. The packers and other components are specially adapted to perform the dynamic sealing function and also, very importantly, to create highly effective seals with the tubing wall even at rod cuts and other deformities. The dynamic sealing action not only greatly simplifies the testing apparatus, but also improves the speed and efficiency of each testing operation.

DESCRIPTION OF THE PREFERRED EMBODIMENTS

Proceeding first to a description of the embodiment of FIGURES 1–4, inclusive, the apparatus and method will be described in connection with the testing of a section 10 of tubing which is present in the upper portion of an oil well, not shown. It is pointed out, however, that the invention may also be employed in pressurizing and/or testing sections of casing and other pipe in oil wells and elsewhere.

Figures 1, 4:
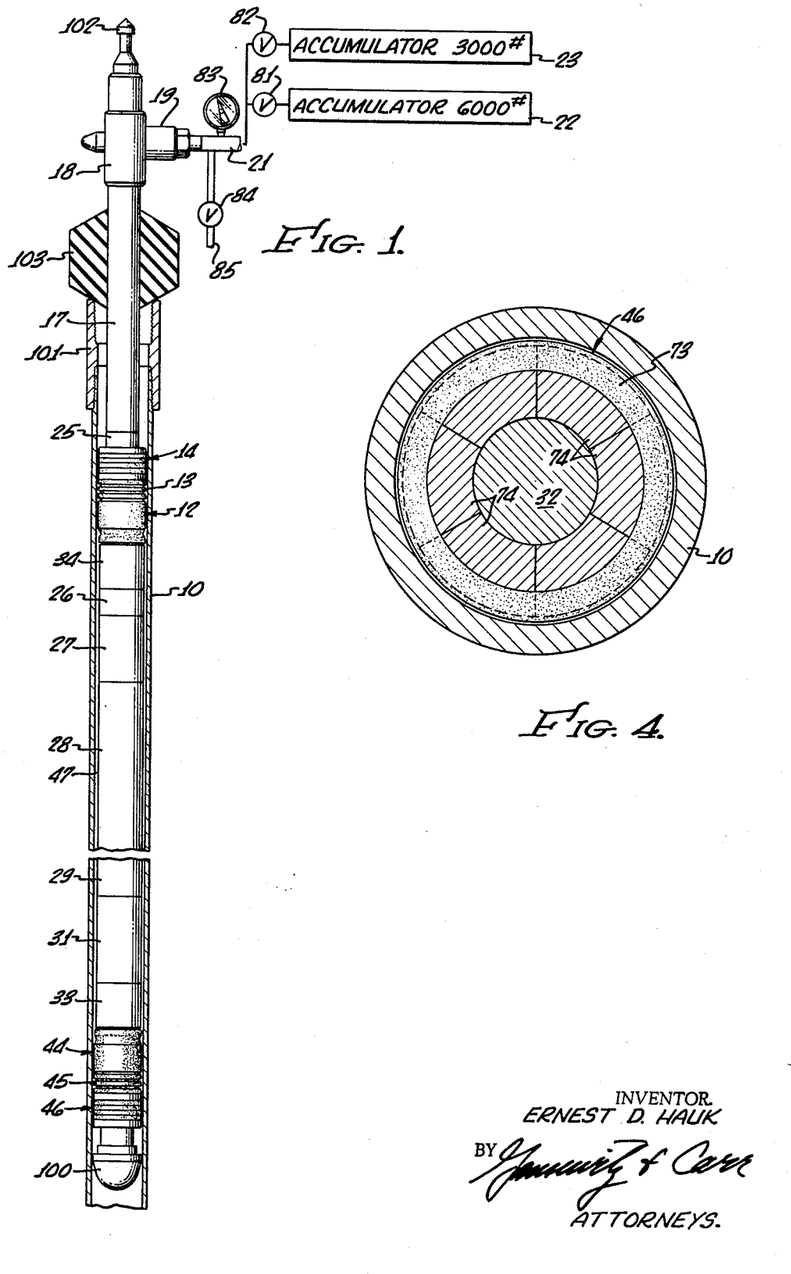
FIGURE 1 is a view showing the tubing in section and showing substantially all of the present testing apparatus in elevation.
FIGURE 4 is an enlarged sectional view taken on line 4—4 of FIGURE 2b.
Figures 2A, 2B:
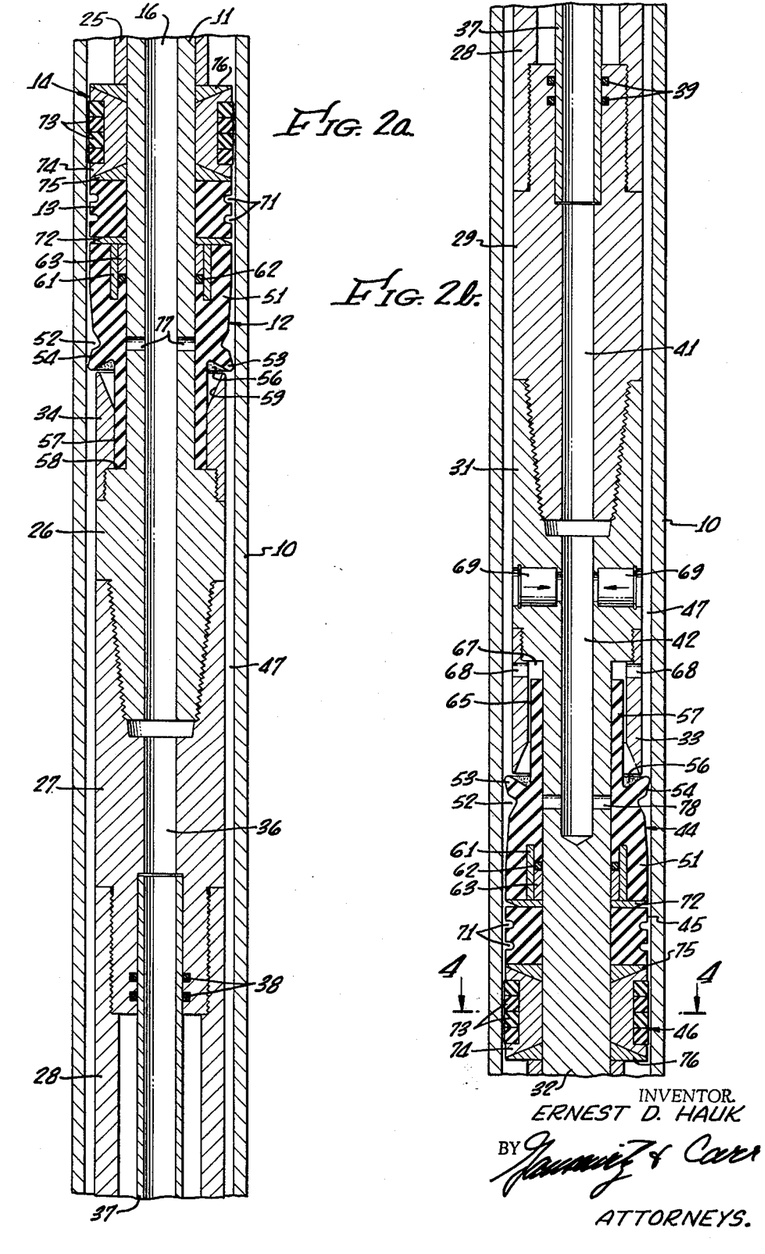
FIGURE 2a is a longitudinal central sectional view of an upper portion of the apparatus of FIGURE 1.
FIGURE 2b is a longitudinal central sectional view of a lower portion of the apparatus of FIGURE 1.

Referring particularly to FIGURE 2a, an upper spindle 11 of tubular shape has slidably mounted thereon the principal upper packer 12, a back-up packing ring 13, and a segmented back-up sealing assembly 14. The passage 16 within spindle 11 communicates through an extension element 17 (FIGURE 1), a lift cap 18, and a removable pressure probe or connector 19 with a flexible conduit or hose 21. Conduit 21, in turn, communicates with a suitable source of fluid under very high pressure.

Preferably, the conduit 21 connects with accumulator means which is illustrated to comprise a high-pressure accumulator 22 and a lower-pressure accumulator 23. For example, accumulator 22 may produce 6,000 p.s.i. fluid pressure, and be of relatively low capacity, whereas the accumulator 23 may have more capacity and produce 3,000 p.s.i. pressure.

The relationship between the accumulators and the other elements is made such that the fluid pressure within the accumulators may be transmitted to the passage 16 within spindle 11 without any substantial leakage. For example, the spindle 11 may be threaded and sealingly connected to extension 17. A suitable spacer 25 is provided around the spindle and adjacent the extension element.

Connected integrally (or otherwise) to the lower end of spindle 11 is a connecting portion 26 which, in turn, is connected by a tapered threaded joint to an upper mandrel 27. A mandrel tube or pipe 28 is threaded to the upper mandrel and extends downwardly to a lower mandrel 29 (FIGURE 2b). Threadedly connected to the lower mandrel, again by a tapered threaded joint, is a connecting portion 31 which is integral with a lower or bottom spindle 32.

A spacer, back-up and orifice element 33 is threadedly connected to portion 31, whereas a back-up element 34 is threadedly connected to the upper end of the upper connecting portion 26 (FIGURE 2a).

The above-mentioned passage 16 within upper spindle 11 extends through portion 26, and communicates with a passage 36 formed axially of the upper mandrel 27. An inner pipe 37 extends upwardly into a counterbore in the upper mandrel, being sealingly associated with such upper mandrel by means of O-rings 38. The pipe 37 extends downwardly, concentrically within the mandrel tube or pipe 28, and is inserted at its lower end (FIGURE 2b) into a counterbore in the lower mandrel 29, there being suitable O-rings 39 provided to make a sealed connection with an axial passage 41 in the lower mandrel. Lower spindle 32 is provided at the upper portion thereof with a passage 42 communicating with passage 41.

It follows that water or other fluid introduced from accumulator means 22–23 may flow downwardly through passages 16 and 36 to inner pipe 37, thence through passage 41 to passage 42. The water flow through these passages effects seal energization and also introduction of the test fluid, as will be described hereinafter.

Mounted on the lower spindle 32 are the principal lower packer 44, a lower back-up packing ring 45, and a lower segmented back-up sealing assembly 46. Such elements 44–46 correspond, respectively, to elements 12–14.

The upper and lower principal packers 12 and 44 define between them an annular test chamber or annulus 47 adapted to contain water or other test fluid under very high pressure such as thousands of pounds per square inch. Such pressure chamber 47 has a low capacity, for example only a few gallons, despite the fact that the distance between the two packers 12 and 44 may be on the order of 60 feet or more. Such small capacity is achieved by causing the outer cylindrical surfaces of elements 34, 26, 27, 28, 29, 31 and 33 to form a continuous cylindrical surface which is spaced only a relatively short distance from the inner wall of tubing 10. The creation of a low-capacity test chamber maximizes the speed and accuracy of the test operation, since it minimizes the effects of the compressibility of the test fluid.

There will next be described the upper and lower principal packers 12 and 44 and the velocity-responsive energization thereof. The upper packer 12 is mounted on spindle 11 in downwardly-facing or inverted relationship, and is formed of a suitable elastomeric material (such as rubber). The rubber or other elastomer forming the upper packer 12 should be sufficiently soft to permit expansion of the packer as well be described, and create an effective seal, but sufficiently hard to minimize wear thereon. As an example, the shore hardness of the upper packer 12 (and also lower packer 44) may be on the order of 65.

Packer 12 has a generally cylindrical body 51 the lower portion of which is frustoconical or downwardly-convergent. The lower or smaller-diameter end of the frustoconical body surface merges with an annular pressure-relief groove 52. The groove 52 is, in turn, on one side of a sealing lip 53 having a downwardly-divergent frustoconical outer surface 54, the latter being located radially-outwardly of an annular pressure groove 56. The maximum diameter of the sealing lip 53 corresponds generally to the maximum diameter of body 51, both of such diameters being sufficiently small to permit substantially frictionless and wear-free relative axial movement between the packer 12 and tubing 10 when the packer is not in energized condition.

Figure 3A:
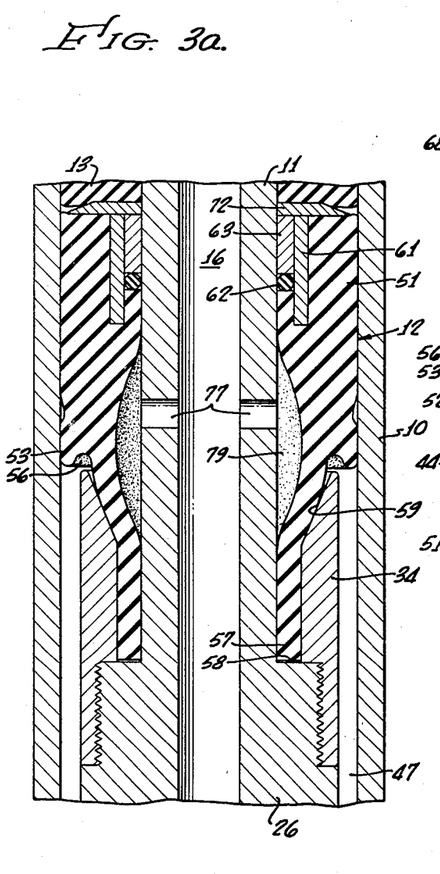
FIGURE 3a is an enlarged view corresponding to the packer portion of FIGURE 2a but showing the packer in energized and sealing condition.

Formed integrally on packer 12 is an elongated tubular neck 57 which extends downwardly in engagement with upper spindle 11, and terminates adjacent a shoulder 58 on connecting portion 26. A substantial region of neck 57, at portions thereof relatively adjacent body 51, is not restrained substantially against radially-outward movement. However, the lower portion of the neck (relatively adjacent the shoulder 58) is restrained by the above-mentioned back-up element 34. Such element 34 fits closely around the lower region of neck 57 and restrains the same against radially-outward movement. The upper-inner region of back-up element 34 is tapered or upwardly-divergent, as indicated at 59, and forms an inclined (frustoconical) back-up surface for the neck when the latter is blown up or ballooned as shown in FIGURE 3a.

The remaining components of the upper packer 12 include a metal sleeve 61 which is molded into the packer body 51 and has an inner diameter substantially larger than that of the upper spindle 11. Sleeve 61 is adapted to receive an O-ring 62 and an associated back-up sleeve or spacer 63. Because the sleeve 61 maintains the packer body 51 rigid despite application of high fluid pressures, and because of the sealing effect of O-ring 62 which is backed up by sleeve 63, fluid introduced into the packer will not pass upwardly therealong but instead will provide a ballooning action. For similar reasons, the lower portion of back-up element 34 prevents flow of fluid downwardly through the packer neck 57.

The lower packer 44 (FIGURE 2b) may correspond exactly to upper packer 12 and has therefore been given the same reference numerals. However, such lower packer is mounted in inverted relationship relative to the upper packer, so that the neck 57 thereof extends upwardly.

The neck 57 of the lower packer 44 is not closely enclosed by the associated spacer, back-up and orifice element 33 which is mounted therearound. Instead, an annular space 65 (FIGURE 2b) is provided radially-outwardly of neck 57 between it and the cylindrical interior surface of element 33. Accordingly, when fluid pressure is introduced into the lower packer it will expand the neck 57. Flow of fluid will then occur through an annular passage 66 (FIGURE 3b) which is temporarily formed when the neck 57 is expanded.

The upper end of neck 57 of lower packer 44 is spaced a substantial distance below a shoulder on connecting portion 31, so that an annular groove or chamber 67 is provided. Such groove 67 communicates through a plurality of ports 68 (formed in element 33) with test chamber 47.

In the present embodiment of the invention, all fluid which enters the test chamber 47 passes through neck 57, chamber 67 and ports 68 as described. Check valves 69 (FIGURE 2b) are provided in connecting portion 31 but, as indicated by the arrows thereon, do not permit flow therethrough from passage 42 outwardly into test chamber 47. Instead, such check valves 69 are so oriented that they will, when fluid pressure within the passage 42 is relieved at the end of each test operation, permit flow of fluid inwardly from chamber 47 into passage 42. Such check valves 69 may be of any suitable type, for example incorporating spring-pressed plungers, or balls.

Depending upon the degree of fluid pressure introduced into the test chamber, and in order to provide safety factors, one or more back-up sealing assemblies may be provided behind each packer 12 and 44. In the present embodiment, and as above indicated, sealing assemblies 13 and 14 are provided behind (above) upper packer 12, and sealing assemblies 45 and 46 are provided behind (below) lower packer 44.

The seals 13 and 45 comprise packing rings formed of rubber or other suitable elastomeric material. Desirably, the hardness of the rubber forming rings 13 and 45 is substantially greater than that of the rubber forming packers 12 and 44, having a shore hardness on the order of (for example) 90. Each packing ring 13 and 45 is a cylindrical element which fits closely around the associated spindle 11 or 32 and has annular sealing grooves 71 in the outer cylindrical surface thereof.

Figure 3B:
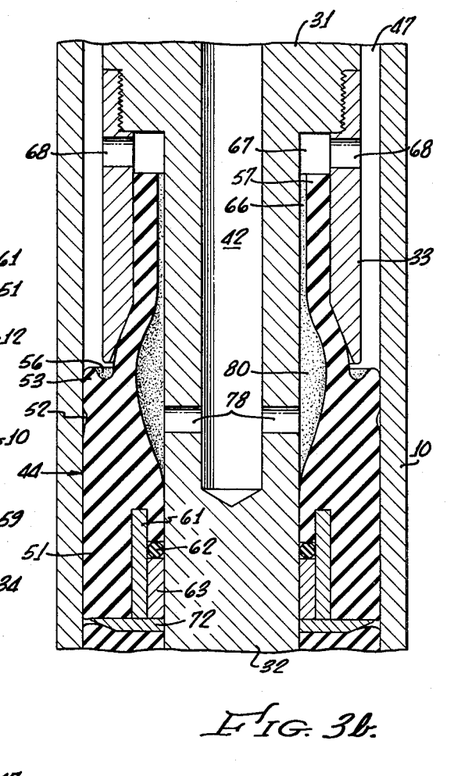
FIGURE 3b is an enlarged view of the packer portion of FIGURE 2b but showing the packer in energized condition.

Tapered washers 72 are provided below upper ring 13 and above lower ring 45, the lower washer 72 having a downwardly-converging edge portion and the upper washer having an upwardly-converging edge portion. When a fluid pressure of thousands of pounds per square inch is introduced into test chamber 47, the packers 12 and 44 move outwardly and force the associated washers 72 into abutment with the central regions of back-up sealing rings 13 and 45. The resulting extrusion or flow of rubber forces the peripheral surface portions of the rings 13 and 45 into sealing engagement with the interior tubing surface, as best shown in FIGURES 3a and 3b.

The upper and lower segmented back-up or sealing assemblies 14 and 46 each comprise a substantial number of elastomeric rings 73 which fit within an annular recess defined by a plurality of cooperating segments 74 (FIGURE 4). The ends of the cooperating segments 74 are concave and preferably conical, and receive cone elements 75 and 76. The relationship is such that when axial pressure is applied to the back-up assemblies 14 and 46 by packing rings 13 and 45, the cones are forced into the cooperating segments 74 to wedge the same radially outwardly.

The assemblies 14 and 46 do not themselves offset substantial seals, but instead cooperate with rings 13 and 45 in achieving effective back-up seals. More particularly, assemblies 14 and 46 prevent excessive extrusion of the rubber forming rings 13 and 45.

It is pointed out that suitable stop means are provided on each of the upper and lower spindles 11 and 32, the upper stop means being above the uppermost cone element 76, and the lower stop means being below the lowermost cone element 76. Therefore, such cone elements 76 are fixed in position and prevent substantial axial shifting of segments 74, etc. There is therefore provided the necessary stop or back-up for the above-stated compression of packing rings 13 and 45, outward wedging of segments 74, etc.

Description of the port means for energizing packers 12 and 44, and description of the method A plurality of pressurizing ports are formed in upper spindle 11 as indicated at 77 in FIGURES 2a and 3a, and provide communication between passage 16 and the interior of upper packer 12. An additional number of ports are shown at 78 (FIGURES 2b and 3b) as provided in lower spindle 32 and afford communication between passage 42 and the interior of lower packer 44. The ports 77 and 78 should be axially located in the general vicinity of lips 53, being preferably radially-inward of the pressure-relief grooves 52.

The present invention contemplates effecting high-velocity flow of fluid to the packers 12 and 44 to energize and expand the same, and substantially simultaneously initiating high-velocity flow of the fluid into test chamber 47 to thereby charge the same.

Stated more specifically, fluid (preferably water, or other low-viscosity liquid) is introduced into the communicating central passages 16, 36, 37, 41 and 42 at such a rapid rate that the pressure therein will build up to a relatively high value, effecting outflow of water through ports 77 and 78 into packers 12 and 44, thereby fluid-expanding the same as shown in FIGURES 3a and 3b. Annular chambers are thereby formed around spindles 11 and 32 and radially-inwardly of lips 53, as indicated at 79 and 80. The pressure in such chambers 79 and 80 is sufficiently high that the lips 53 are forced outwardly into sealing engagement with the interior tubing surface.

During the time that the fluid pressure is maintained in chambers 79 and 80, fluid is flowing through passage 66 within the expanded neck 57 (FIGURE 3b) of the lower packer 44, and thence through chamber 67 and ports 68 into the test chamber 47. This flow is extremely rapid and quickly builds up the pressure within test chamber 47 to such value that an energizing pressure is provided in each pressure groove 56 (radially-inwardly of each lip 53). The fluid pressure against the lip surfaces which define the outer portions of grooves 56 forces the lips 53 into highly-effective sealing engagement with the tubing wall, even at irregularities and rod cuts therein. Such fluid pressure is particularly effective because of the presence of the pressure-relief grooves 52 and associated tapered portions 54 (FIGURES 2a and 2b) of the lips.

As soon as the pressure within test chamber 47 has built up until it is substantially equal to that within the spindles, there is no longer a pressure differential across the necks 57 of the packers. However, two conjoint actions remain effective to continue the seals between lips 53 and the tubing surface. One such action is provided (as above indicated) by the pressure within grooves 56, which forces lips 53 outwardly into sealing engagement with the tubing. In this connection it is pointed out that the pressure in pressure-relief grooves 52 is lower than that within the test chamber 47, and thereby enhannces and facilitates the described sealing effect. The other action is that the pressure remaining within chambers 79 and 80 (FIGURES 3a and 3b) acts outwardly against the interiors of the packers, in the regions radially-inwardly from pressure-relief grooves 52, and thereby enhances the action whereby the lips 53 are forced against the tubing wall. The seal is caused to occur, and remain, at the edge or rim of each lip 53.

It will be understood that effective sealing is rapidly achieved and maintained without the use of relief valves, multiple conduits or other apparatus employed by the prior art.

The present method contemplates introducing the water extremely rapidly, and providing sufficient constriction and friction downstream from ports 77 and 78 that the formation of chambers 79 and 80 and consequent expansion of the packers will result. The constriction is created primarily by the fact that the annular passage 66 within the lower neck 57 (FIGURE 3b) is relatively small in cross-sectional area, as are the combined ports 68. It is pointed out that the word "downstream," as employed relative to ports 77, does not denote chamber 79 but instead denotes elements 36, 37, 41, 42, 78, 66, 67 and 68.

The requisite high-velocity flow of fluid is achieved by means of the accumulators 22 and 23 previously indicated relative to FIGURE 1, although in some cases high-flow pumps may be employed. Such accumulators are connected to conduit or hose 21 through valves 81 and 82, respectively, such conduit 21 having a suitable pressure gauge 83 associated therewith to indicate fluid pressure.

The valve 82 is first opened to permit rapid flow of water from accumulator 23 through conduit 21 and associated passages into the packers 12 and 44 to energize the same as described above. Accumulator 23 is, by itself, fully adequate to pressurize the chamber 47 to a pressure of thousands of pounds per square inch and may thus perform test operations in numerous cases. Should higher pressures be required, the higher-pressure accumulator 22 is employed by first closing valve 82 and then opening valve 81. The pressure in the system is therefore increased due to flow of additional fluid through conduit 21, into the packers and into the test chamber 47. Valve 81 is closed after the accumulator 22 has delivered its pressure. Should an even higher pressure be desired, such as 8,000 p.s.i., another accumulator or a high-pressure pump may be utilized.

Although the pressure of the accumulators should be very high, in order to generate the requisite flow velocity and also to permit pressure build-up within the test chamber 47, the pressure within the packers 12 and 44 (during the pressure build-up) may be relatively low, for example 100 p.s.i.

The presence of a leak from test chamber 47 is indicated by the gauge 83, since (both valves 81 and 82 being closed) the gauge pressure will commence to decrease if a leak is present. Because water is employed as a test medium, and because the test chamber is small in volume, the leak will show up rapidly on the gauge 83. The combination of highly rapid introduction of liquid into the chamber, and the rapid indication of a leak on the gauge 83 after introduction of fluid is terminated, means that the entire testing operation requires only a very minimum of time.

At the conclusion of the test operation, pressure is relieved from conduit 21 by opening a valve 84 communicating with a drain 85. The pressure within the spindles then becomes lower than that within the test chamber 47, so that water flows outwardly from chamber 47 through check valves 69 (FIGURE 2b) and into the passages 42, etc. The relieving of the pressure also de-energizes the upper and lower packers 12 and 44, so that a certain amount of the water within the test chamber 47 flows downwardly around the lower packer 44 and into the well. It is pointed out that the back-up seals 13, 14, 45 and 46 are energized as described above at the beginning of the test operation, and are subsequently de-energized (due to relief of the axial pressure) at the end of the test operation.

Should it be desired to prevent flow of a substantial amount of water into the well bore, an additional step may be provided in the method. Such step comprises first introducing air under pressure (such as several hundred p.s.i.) through conduit 21 into the spindles and thus into the test chamber 47. Such air will energize the upper and lower packers 12 and 44, and will cause the air pressure within chamber 47 to be several hundred p.s.i. Thereafter, water is introduced by the accumulators 22 and 23, causing the test chamber 47 itself to be an accumulator. After conclusion of the test operation, and when the pressure within the spindles is relieved, the pressurized air forces the water from test chamber 47 outwardly through check valves 69 before the packers 12 and 44 become de-energized. For such mode of operation, the check valves 69 are located at a sufficiently low elevation that substantially all of the water will drain therethrough.

It is pointed out that the lower packer 44 may, if desired, be designed in such a way that the spilling of water into the well bore may be prevented even in the absence of pre-introduction of air pressure into the test chamber as described above.

Suitable hydraulic means, not shown, are provided to recharge the accumulators after each test operation. It is pointed out that the accumulators themselves may, if desired, be placed down the well bore and the testing (or other pressurizing operation) performed at a lower level in the well. Thus, for example, the present invention is not limited to the testing of tubing or other well pipe during introduction or during withdrawal from the well, but may be employed to pressurize any annulus (within an oil well or elsewhere). For example, by introducing the accumulators far down the well, a section of casing at a location thousands of feet beneath the surface of the earth may be pressurized in a highly simple manner, for testing or other purposes, without use of relief valves and using only a single fluid conduit.

If the water were introduced slowly into the present apparatus, instead of rapidly, the apparatus would not work in that no seal would ever be created at either lip 53. To illustrate this fact, let it be assumed that the valve 82 of accumulator 23 is opened only a very small amount, permitting only a slow flow of fluid into the spindles and thus into the upper and lower packers 12 and 44. The water pressure within the spindles would rise slowly, but as soon as such pressure reached a low level (far less than 100 p.s.i.) the neck 57 of lower packer 44 would enlarge to form the passage 66. Thus, the pressure would escape through annulus 67 and ports 68, there being insufficient pressure to force the lips 53 radially outwardly into the sealing positions shown in FIGURES 3a and 3b. Accordingly, the water would drain from chamber 47 past the lower lip 53, so that the apparatus would be inoperative. In contrast to such inoperative method, the present invention contemplates the full opening of valve 82 to create a high-velocity flow.

An operative but commercially impractical apparatus would result if the ports or passages 66 and 68 (FIGURE 3b), or the metering orifices 92 of the second embodiment (FIGURES 5 and 6), were made extremely small in cross section. The packers 12 and 44 would then enlarge and seal off the test chamber even if the velocity of fluid flow were low. However, the charging of the test chamber 47 would then require a long time, such as minutes or hours, which would render the apparatus non-competitive with prior-art testing apparatus. Accordingly, the present method contemplates providing a flow path (between the spindle passages and the chamber 47) which communicates with the interiors of the fluid-expansible packers 12 and 44, such flow path presenting insufficient constriction and friction to prevent charging of chamber 47 in a short time period which is less than one minute and is preferably on the order of a few seconds. On the other hand, the constriction and friction present in the flow path at points downstream from the packers (but upstream from chamber 47) is caused to be sufficiently great that the requisite packer-expanding pressure will be developed as the liquid passes at high velocity through the flow path.

The neck 57 of lower packer 44 may originally be made larger in diameter, namely the diameter shown in FIGURE 3b, there then being no necessity to balloon out such neck and thus form the passage 66. In such construction, passage 66 would be present even before application of fluid pressure. Thus, it is emphasized that such expansion of the neck 57 is not essential to the invention, such neck 57 only being made initially of small diameter in order to achieve production economy so that the upper and lower packers can be identically constructed.

To illustrate (by way of example only, and not limitation) a rate of flow which is highly operative and satisfactory, let it be assumed that the distance between the upper and lower packers is on the order of 60 feet (although it may be 30 feet, 100 feet, etc.). Let it also be assumed that the capacity of the test chamber 47 is approximately two gallons. The 3,000-pound accumulator 23 would then require on the order of four seconds to introduce the two gallons through the various conduits and into the test chamber 47. Such flow rate, of 30 gallons per minute, is very high in comparison to flow rates of prior-art apparatus. As soon as the chamber 47 is charged by the lower-pressure accumulator 23, automatic valve-actuating means are employed to shut valve 82 and open valve 81, following which the high-pressure accumulator 22 rapidly pressurizes the chamber 47 (in only a second or two) to the full 6,000 p.s.i. pressure or higher pressure.

Therefore, in approximately six to eight seconds or less, the test chamber is filled and pressurized. It is then necessary to watch the gauge 83 (after closing of valves 81 and 82) for only about five seconds (or less) in order to determine whether or not there is a leak. It follows that filling of the test chamber and watching the gauge 83 require less than fifteen seconds, which is less than the time required by conventional prior-art apparatus for merely filling the chamber. Thus, the present apparatus and method achieve the combined goals of simplicity and high testing speed.

As a specific example (given for purposes of illustration only, not limitation) of an apparatus which will operate satisfactorily, and which will achieve the flow rate specified in the previous paragraphs, conduit 21 may be 100 feet long and have an inner diameter of ½ inch. The combined passage 16, 36, 37, 41 and 42 may be 60 feet long and have a diameter of ½ inch. There may be two ports 77, the diameter of each being ¼ inch or less. There may be four ports 78, the diameter of each being ¼ inch. There may be four ports 68, the diameter of each being ¼ inch. The inner diameter of the tubing 10 may be approximately 2½ inches (2.347 inch "drift diameter"), and the outer diameter of lips 53 prior to expansion thereof may be 2⅜ inches. The outer diameters of upper and lower spindles 11 and 32 may be 1.125 inches. The radial dimension of annular passage 66 may be 0.05 inch so that the inner diameter of the expanded neck 57 (FIGURE 3b) is 1.225 inch.

Figures 5, 6:
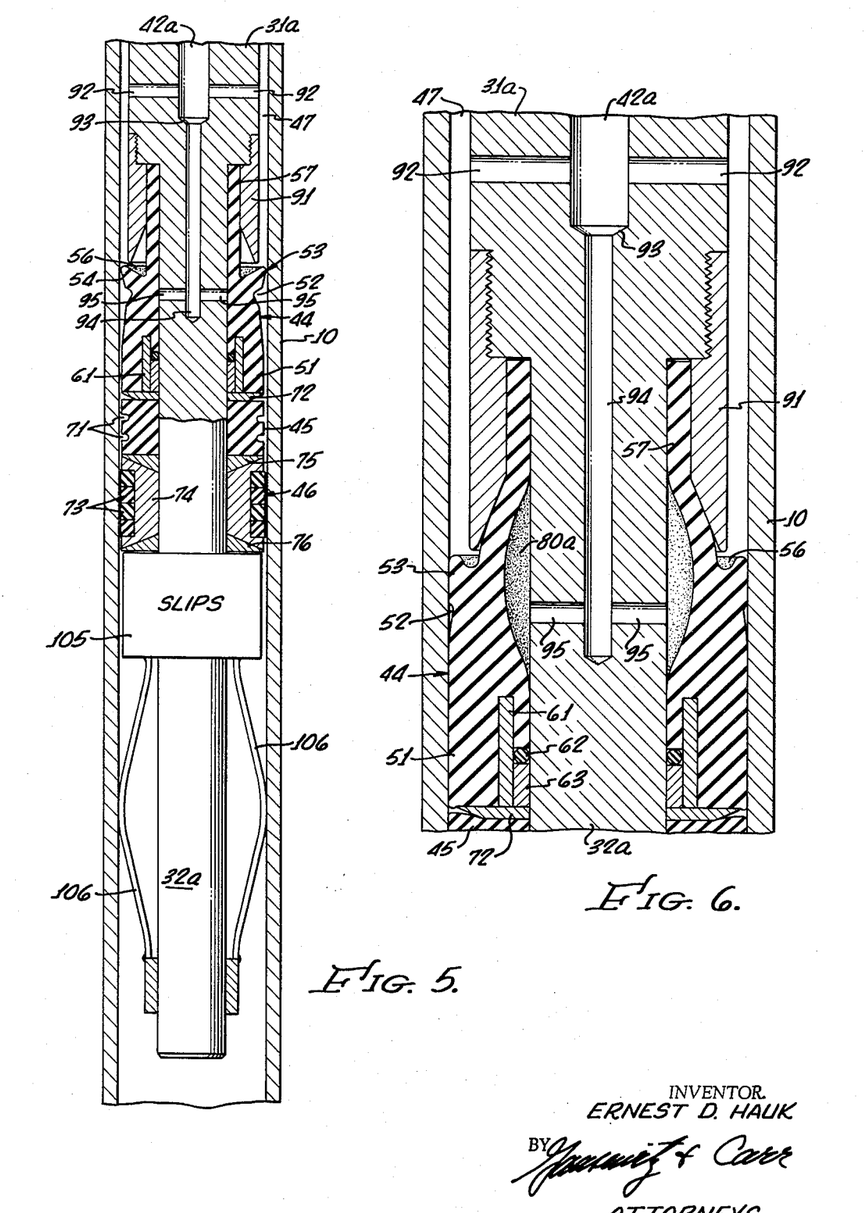
FIGURE 5 is a longitudinal central sectional view corresponding generally to the lower portion of FIGURE 2b but illustrating a second embodiment wherein all check valves are eliminated.
FIGURE 6 is an enlarged view corresponding to the packer portion of the showing of FIGURE 5 but showing the packer in energized condition.

Embodiment of FIGURES 5 and 6

The upper portion of the embodiment of FIGURES 5 and 6 may be identical to that of the previous embodiment, that is to say the same as the construction shown in FIGURE 2a.

The lower portion of the embodiment of FIGURES 5 and 6 is (except as will be stated) also identical to the upper portion of such embodiment except that the lower packer 44 is inverted relative to the upper. Thus, the back-up element 91 fits closely around the neck 57 of the packer 44, the result being that fluid may not flow through (as distinguished from into) the lower packer 44. Element 91 corresponds to the upper back-up element 34 of the first embodiment (and also of the second embodiment).

The primary difference between the first and second embodiments is that the check valves 69 of the first embodiment are omitted and are replaced by orifices or metering passages 92. Such passages are formed in the connecting portion 31a and extend radially-outwardly from passage 42a to test chamber 47. Also, in the second embodiment, the passage 42a through the lower spindle may be necked-down at 93 so that the lower end portion 94 thereof is smaller in diameter than is the lower portion of the passage 42 shown in FIGURE 2b. Such necked-down lower portion communicates through ports 95 with the interior of the packer. Ports or passages 95 correspond to ports 78 of the previous embodiment except that they may be smaller in diameter and longer in length.

The method of the second embodiment of the invention corresponds to the first embodiment in that the water or other fluid is introduced very rapidly. It follows that, despite the presence of the ports or passages 92 which communicate directly with test chamber 47, the pressure in the communicating passages 16, 36, 37, 41, 42a and 94 will be sufficiently high to effect (through passages or ports 77 relative to the upper packer 12, and passages 95 relative to lower packer 44) ballooning out of the upper and lower packers to thereby effect the above-described initial sealing action whereby lips 53 sealingly engage the interior tubing wall. Thus, for example, the lower packer 44 is ballooned out to form therein a chamber 80a corresponding to chamber 80 of the showing of FIGURE 3b. Such packer expansion in response to the fluid pressure continues at least until the pressure in the test chamber 47 has built up sufficiently to permit the pressure in groove 56 (and also the pressure chamber 80a) to maintain lips 53 in sealing contact with the tubing wall.

After the time delay period during which the gauge 83 is watched, the fluid pressure within the spindles is relieved, water then flowing inwardly from test chamber 47 through the orifices 92 into the spindles. This continues until the lower packer 44 becomes de-energized so that the remaining water may (unless the air-accumulator method is employed as stated relative to the first embodiment) discharge downwardly around the lower packer 44 into the well bore.

As a specific example, which is given by way of illustration only and not limitation, there may be two orifices 92 each having a diameter of 5/16 inch. This assumes that all factors (dimensions, pressures, rubber hardnesses, etc.) are the same as stated relative to the first embodiment. It is to be understood that the various factors may vary considerably, as (for example) when the diameter of pipe 10 is different from that assumed for the present examples.

The passages 36, 37, 41, 42a and 92 are "downstream" from ports 77. The passages 92 are "downstream" from ports 95. All of such uses of the word "downstream" in the present specifications and claim refer to the flow which effects charging or pressurizing of chamber 47.

Methods of utilizing the present invention for well pipe testing

In the above description of the first and second embodiments of the invention, no mention has been made of the manner of manipulating the testing apparatus. This is because either embodiments may be employed in either what is known as the "stab-in" system or the "follow-on" system. For convenience of illustration only, but not limitation, the embodiment of FIGURES 1–4 has been shown as employed in the "stab-in" system, whereas the embodiment of FIGURES 5 and 6 is illustrated as adapted for the "follow-on" system.

In the "stab-in" system (FIGURES 1–4) the entire test apparatus is lifted upwardly out of the tubing stand after each test operation. In the "follow-on" system of FIGURES 5 and 6, the test apparatus remains in the well at all times. The present apparatus is readily adapted for either type of operation.

Referring to FIGURES 1–4, a stabber bulb 100 is mounted at the lower end of the testing apparatus for insertion through a collar 101 at the upper end of tubing 10. A spear 102 is provided at the extreme upper end of the apparatus, above lift cap 18, being adapted to be inserted into a grasping apparatus (not shown) known as an "overshot." The overshot is connected by a cable to a winch on the derrick above the wellhead. A cushion 103, formed of rubber, is mounted on the extension element 17 and is adapted to seat on the upper edge of collar 101, thereby preventing undesired downward movement of the test apparatus into tubing 10.

The overshot and winch are employed to lower the testing apparatus to the illustrated position, with cushion 103 seating on collar 101. Such lowering is facilitated by the stabber bulb 100 which assists introduction of the apparatus into the collar 101. The pressure probe 19 is then inserted into the lift cap 18 to make a sealed connection between conduit 21 and the passages 16, etc., within the spindles. Thereupon, the testing operation is effected, following which the overshot is employed to lift the entire apparatus completely out of the tubing.

A new section of tubing is then threaded into the collar 101, and the tubing stand is lowered until the collar at the upper end of the newly-threaded section is at the position previously held by the illustrated collar 101. The entire test operation is then repeated. It is to be understood that conventional apparatus such as exterior slips, tongs, etc., are provided to support the tubing and make the joints.

Should a leak be found in any stand of tubing, it and the entire testing apparatus are lifted out of the well while the pressure is being applied (conduit or hose 21 being sufficiently long for this purpose). The location of the leak is then readily determined by visual inspection, following which repair or replacement of the defective part is effected.

In the "follow-on" mode of operation, FIGURES 5 and 6, interior slips 105 and associated drag springs 106 are provided at the lower end of lower spindle 32a. The slips 105 (and associated mechanism) are illustrated schematically only, and may correspond to those shown in Patent No. 3,071,960 cited above. Slips 105 support the entire testing apparatus within the tubing string, there then being no cushion 103 as in the "stab-in" mode of operation.

Let it be assumed that the slips 105 are supporting the apparatus in the tubing 10, at such elevation that the lift cap 18 and spear 102 project above the upper end of the tubing string (above collar 101). Probe 19 is then connected and the accumulators are utilized to perform the above-specified testing operation. Thereafter, the probe 19 is removed and an additional section of tubing is lowered over the spear 102 and threadedly connected with the collar 101, this being possible because of the absence of the cushion 103.

The entire tubing string (together with the testing apparatus contained therein) is then lowered until the newly-mounted tubing section is in the position formerly occupied by the section therebeneath. Thereafter, the overshot (not shown) is lowered downwardly into the tubing string and automatically coupled to the spear 102. The overshot is then raised until the spear 102 and lift cap 18 are above the end of the entire tubing string. The apparatus is then lowered a slight amount until the drag created by springs 106 operates to set the slips 105 and prevent downward movement of the testing apparatus in the tubing string. Thereafter, the overshot is removed, pressure probe 19 is introduced, and a test operation is performed as before.

In its broader aspects, the present invention applies not only to packers which are substantially entirely elastomeric, but also to those wherein a cylinder and piston combination (for example) is employed to squeeze and thus enlarge a toroidal of other seal. All of such packers and associted apparatus may be regarded as "fluid-expansible packers."

The stated method may be employed to test simultaneously a number of connected pipe sections, thereby testing not only the pipes themselves but also the joints therebetween.

The foregoing detailed description is to be clearly understood as given by way of illustration and example only.

What is claimed is:

1. A method of defining a sealed chamber within a pipe, and of building up fluid pressure within said chamber, said method comprising:
providing first and second fluid-expansible packers in a pipe and in spaced relationship from each other,
said packers being adapted when fluid-expanded to sealingly engage the wall of said pipe and thus seal off a chamber between said packers within said pipe, and
effecting high-velocity introduction of a fluid substantially simultaneously into said first and second packers and into said chamber whereby to fluid-expand said packers and thus seal off said chamber.

2. The invention as claimed in claim 1, in which said method further comprises passing through only a single conduit all of the fluid introduced into said packers and into said chamber.

3. The invention as claimed in claim 1, in which said method further comprises introducing said fluid in the form of a liquid, and at a flow rate on the general order of 30 gallons per minute.

4. The invention as claimed in claim 1, in which said method further comprises relating the interiors of said packers and the fluid flow path into said chamber in such manner that the interiors of said packers are subjected to the pressure of the fluid flowing toward said chamber but upstream from said chamber.

5. The invention as claimed in claim 4, in which said method further comprises creating in said fluid flow path, downstream from said packers, sufficient friction and constriction that said fluid when flowing toward said chamber at high velocity will build up sufficient fluid pressure within said packers to expand the same into sealing contact with said pipe wall, but insufficient friction and constriction to prevent rapid filling of said chamber.

6. The invention as claimed in claim 1, in which said method further comprises providing said fluid in the form of a low-viscosity liquid, and storing said liquid in a high-pressure accumulator prior to said introduction thereof into said packers and into said chamber.

7. The invention as claimed in claim 1, in which said method further comprises charging said chamber to a predetermined fluid pressure, discontinuing the introduction of fluid into said chamber, and then determining whether or not fluid leaks out of said chamber to thus locate leaks in said pipe.

8. The invention as claimed in claim 1, in which said method further comprises introducing said fluid in the form of a gas, thereafter introducing liquid into said chamber to pressurize the same and compress said gas, and thereafter employing said compressed gas to recover said liquid from said chamber.

9. A method of defining a sealed chamber within a pipe, and of building up fluid pressure within said chamber, said method comprising:
providing first and second fluid-expansible packers in a pipe and in spaced relationship from each other,
said packers being adapted when fluid-expanded to sealingly engage the wall of said pipe and thus seal off a chamber between said packers within said pipe,
said packers being adapted in response to the present of substantial fluid preessure within said chamber to maintain their sealing engagement with said pipe wall, and
effecting high-velocity introduction of a fluid substantially simultaneously into said first and second packers and into said chamber whereby initially to fluid-expand said packers and thus seal off said chamber, and subsequently to build up sufficient fluid pressure in said chamber to maintain the sealing engagement between said packers and said pipe wall.

10. The invention as claimed in claim 9, in which said pipe is a section of oil well pipe and is verticaly disposed in the upper end of a well bore, and in which said method further comprises charging said chamber to a predetermined fluid pressure, discontinuing the introduction of fluid into said chamber, and then determining whether or not fluid leaks out of said chamber to thus locate leaks in said pipe.

11. Apparatus for defining, sealing and charging a chamber within a section of pipe, which comprises:
elongated conduit means having a longitudinal flow passage therein,
said conduit means having an outer diameter substantially smaller than the inner diameter of the pipe section into which it is to be introduced, thus providing a radial clearance therebetween,
first and second packers associated with said conduit means and disposed in spaced relationship from each other,
said packers normally having outer diameters substantially smaller than the inner diameter of said pipe section whereby to facilitate longitudinal movement of said packers and conduit means within and relative to said pipe section,
said packers being adapted upon introduction of a predetermined fluid pressure therein to expand into sealing contact with said pipe section and thus define a chamber between said packers,
means to create between said conduit means and said chamber flow-path means such that fluid under relatively low pressure may flow from said conduit means into said chamber to charge the same,
said flow-path means communicating with the interiors of said packers whereby the presence of sufficient fluid pressure in said flow-path means will build up said predetermined fluid pressure in said packers and thus expand the same into sealing contact with said pipe section, and
means to introduce a fluid into said conduit means at a sufficient velocity that said fluid will build up said predetermined fluid pressure in said flow-path means and thus in said packers and will, substantially simultaneously with said fluid pressure build-up in said packers, commence high-flow charging of said liquid through said flow-path means and into said chamber.

12. The invention as claimed in claim 11, in which said last-named means comprises a high-pressure, high-capacity pressure source.

13. The invention as claimed in claim 12, in which said fluid is a low-viscosity liquid, said pressure source is an accumulator containing said liquid at a pressure on the order of thousands of pounds per square inch, and in which said flow-path means incorporates, at portions thereof downstream from the points of communication thereof with said packers, means to create sufficient friction and constriction to permit said build-up of said predetermined fluid pressure in said packers, but insufficient friction and constriction means to prevent charging of said chamber with said liquid in a short period of time.

14. The invention as claimed in claim 12, in which said fluid is a low-viscosity liquid, and in which said pressure source is an accumulator containing said liquid at a pressure on the order of thousands of pounds per square inch.

15. The invention as claimed in claim 11, in which said flow-path means incorporates, at portions thereof downstream from the points of communication thereof with said packers, means to create sufficient friction and constriction to permit said build-up of said predetermined fluid pressure in said packers, but insufficient friction and constriction to prevent charging of said chamber with said fluid in a short period of time.

16. The invention as claimed in claim 15, in which said friction and constriction creating means is so related to said fluid-introduction means that said period of time is on the order of a few seconds.

17. The invention as claimed in claim 11, in which said flow-path means comprises a path through one of said packers and into said chamber.

18. The invention as claimed in claim 11, in which said flow-path means communicates directly with said chamber independently of said packers and through metering-orifice means.

19. The invention as claimed in claim 11, in which said last-named means includes only a single elongated flexible conduit connected to a high-pressure water source.

20. The invention as claimed in claim 11, in which each of said packers is formed of elastomeric material and is provided with a sealing lip adapted to engage and seal against the inner wall of said pipe section in response to pressure within said packer, and also in response to pressure within said chamber, whereby the seals will be effectively maintained after said chamber is fully charged.

21. The invention as claimed in claim 20, in which each of said packers incorporates an annular pressure-relief groove on the exterior surface thereof and on the side of said lip remote from said chamber.

22. The invention as claimed in claim 21, in which the exterior wall of each of said packers is generally convergent, in a direction from said chamber, at the region between said pressure-relief groove and the extreme edge of said lip.

23. The invention as claimed in claim 11, in which said conduit means includes spindle portions on which said packers are movably mounted for limited shifting in directions away from the center of said chamber, and in which back-up sealing elements responsive to said shifting are provided on the sides of said packers remote from said chamber.

24. The invention as claimed in claim 23, in which said back-up sealing elements comprise elastomeric sealing rings mounted on said spindle portions outwardly adjacent said packers.

25. The invention as claimed in claim 24, in which said back-up sealing elements further comprise segmented rings mounted on said spindle portions adjacent said elastomeric rings, and in which means are provided to shift the segments of said rings radially-outwardly in response to longitudinal shifting of said packers.

26. The invention as claimed in claim 11, in which said apparatus is a leak-testing apparatus for oil-well pipe, in which gauge means are provided to indicate leaks from said chamber after charging thereof, and in which means are provided to position said apparatus vertically in a section of oil-well pipe when such section is vertically oriented in the upper regions of a well bore.

References Cited
UNITED STATES PATENTS

| | | | |
|---|---|---|---|
| 3,165,918 | 1/1965 | Loomis | 73—40.5 |
| 3,165,919 | 1/1965 | Loomis | 73—40.5 |
| 3,333,459 | 8/1967 | Claycomb | 73—40.5 |
| 3,354,697 | 11/1967 | Wilkerson | 73—40.5 |

LOUIS R. PRINCE, Primary Examiner

JEFFREY NOLTON, Assistant Examiner

U.S. Cl. X.R.

73—40.5; 166—4

UNITED STATES PATENT OFFICE
CERTIFICATE OF CORRECTION

Patent No. 3,478,577            Dated November 18, 1969

Inventor(s)    Ernest D. Hauk

It is certified that error appears in the above-identified patent and that said Letters Patent are hereby corrected as shown below:

Column 12, line 26, cancel "present" and substitute -- presence --; same line cancel "preessure" and substitute -- pressure --.
     Column 14, line 9, after "direction" insert -- away --.

SIGNED AND SEALED
APR 28 1970

(SEAL)
Attest:

Edward M. Fletcher, Jr.
Attesting Officer

WILLIAM E. SCHUYLER, JR.
Commissioner of Patents